United States Patent [19]
Buehler

[11] Patent Number: 4,471,064
[45] Date of Patent: Sep. 11, 1984

[54] OLEFIN POLYMERIZATION CATALYST ACTIVITY BY OLEFIN WASHING AND READDITION OF ELECTRON DONOR

[75] Inventor: Charles K. Buehler, Naperville, Ill.

[73] Assignee: Northern Petrochemical Company, Omaha, Nebr.

[21] Appl. No.: 530,497

[22] Filed: Sep. 9, 1983

[51] Int. Cl.³ .............................................. C08F 4/64
[52] U.S. Cl. .................................... 502/108; 502/127; 526/142
[58] Field of Search ................................ 502/108, 127

[56] References Cited

U.S. PATENT DOCUMENTS

| T951,009 | 10/1976 | Jaggard | 502/105 X |
|---|---|---|---|
| 3,046,266 | 7/1962 | Benning et al. | 502/169 X |
| 3,062,801 | 11/1962 | Hoeg et al. | 502/108 X |
| 3,067,183 | 12/1962 | Hagemeyer et al. | 502/108 X |
| 3,239,497 | 3/1966 | Machida et al. | 502/108 X |
| 3,404,096 | 10/1968 | Lamborn | 502/108 |
| 4,008,177 | 2/1977 | Rust et al. | 502/108 X |
| 4,048,415 | 9/1977 | Matsuzawa et al. | 502/127 X |
| 4,242,480 | 12/1980 | Welch | 502/127 X |
| 4,312,784 | 1/1982 | Welch et al. | 502/127 X |
| 4,343,721 | 8/1982 | Goodall et al. | 502/127 X |

FOREIGN PATENT DOCUMENTS 733718  5/1980  U.S.S.R. .............................. 502/108

Primary Examiner—Patrick Garvin
Attorney, Agent, or Firm—Donald F. Haas

[57] ABSTRACT

A method is disclosed for increasing the productivity of an olefin polymerization catalyst. The catalyst contains an aluminum chloride co-crystallized titanium halide modified with an electron donor containing an ester group. The catalyst component is washed with an olefin and then electron donor is added back to the washed catalyst component, thereby greatly increasing its productivity without significantly adversely affecting the crystallinity of the polymer produced.

8 Claims, No Drawings

OLEFIN POLYMERIZATION CATALYST ACTIVITY BY OLEFIN WASHING AND READDITION OF ELECTRON DONOR

BACKGROUND OF THE INVENTION

This invention relates to a method for increasing the productivity of olefin polymerization catalysts and to the production of such a catalyst which exhibits better productivity and produces a polymer with acceptable stereospecificity. More particularly, the invention relates to a method for washing an aluminum chloride co-crystallized titanium halide, which has been modified with an electron donor containing an ester group, with an olefin and readding the electron donor to increase the productivity of the catalyst.

U.S. Pat. No. 4,048,415, issued Sept. 13, 1977, discloses an improved process for the polymerization of olefins with a catalyst which has a titanium trichloride component prepared by reduction of titanium tetrachloride with hydrogen, silicon, metallic titanium or metallic aluminum, a complex of aluminum chloride with an electron donor, and a polysiloxane, and extracting the complex from the catalyst with a saturated hydrocarbon. The patentee desires to remove the complex, aluminum chloride, and electron donor which the patentee states are detrimental to the polymerization. I have found that better catalyst productivity can be obtained without sacrificing stereospecificity if the catalyst is washed with an olefin rather than a saturated hydrocarbon. Furthermore, readdition of the electron donor improves the productivity of the catalyst.

U.S. Pat. No. 3,404,096, issued Oct. 1, 1968, discloses a method for improving a titanium trichloride catalyst by pretreating the catalyst in an inert diluent in the absence of an activator with an olefin having 2 to 6 carbon atoms for a minimum of about 10 minutes. It is said that the catalyst undergoes a physical change whereby it agglomerates into curds and appears to swell. Defensive Publication T951,009, published Oct. 5, 1976, discloses an olefin polymerization catalyst which comprises titanium trichloride ground together with octamethylphyrophosphoramide wherein the two components are ground together in a bass mill and then contacted with propylene for a time sufficient for from 0.1 up to 5.0 moles of propylene to be taken up by the titanium compound. Both of the above catalysts are different from the catalyst of the present invention in that they do not contain an electron donor modifier containing an ester group, they both appear to react with the olefin such that material is added to the catalyst, ad there is no addition of electron donor after the olefin treatment.

SUMMARY OF THE INVENTION

The present invention is a method for increasing the productivity of an olefin polymerization catalyst containing an aluminum chloride co-crystallized titanium halide modified with an electron donor containing an ester group which comprises washing the modified titanium halide with an olefin and then adding back electron donor thereto. In a preferred embodiment of the invention, the electron donor is an organic acid ester such as a benzoic acid ester, ethyl phenyl acetate, or a halogenated carboxylic acid ester. It is preferred that the olefin washing take place for a period of from at least about one minute. It is preferred that from about 0.1 to about 2 grams of the electron donor per gram of catalyst be added back to the washed catalyst.

DETAILED DESCRIPTION OF THE INVENTION

The catalyst produced by the process of the present invention can be used to polymerize or copolymerize one or more alpha olefin monomers such as ethylene, propylene, 1-butene, 3-methyl-1-butene, 1-pentene, 4-methyl-1-pentene, 1-hexene, styrene, 1-octene, dodecene, and tetradecene. The catalyst component treated according to our process comprises an aluminum chloride co-crystallized titanium halide which has been modified with an electron donor containing a carbon-oxygen bond.

Titanium halide co-crystals which are particularly suitable are obtained by co-crystallizing titanium trichloride with aluminum trichloride. Co-crystals of the formula $TiCl_3 \cdot 1/3 AlCl_3$ are particularly suitable. Titanium trichloride can be obtained by reducing titanium tetrachloride with hydrogen, aluminum or an aluminum-organic compound. The appropriate titanium halides are commercially available and hence do not require further comment.

The electron donor can be selected from a wide variety of organic compounds which have an ester group. These include, but are not limited to, alkyl esters of aliphatic monocarboxylic acids, alkyl esters of aromatic monocarboxylic acids, and alkyl esters of saturated and unsaturated aliphatic and aromatic acids. Particularly preferred for use in the present invention are the alkyl esters of organic acids, especially monocarboxylic acid esters such as benzoic acid esters including ethyl, butyl, and benzyl benzoate, ethyl phenyl acetate, and halogenated carboxylic acid esters such as ethyl 4-chlorobutylate. The most highly preferred electron donors for use in the present invention are butyl benzoate and ethyl phenyl acetate because of the ease of ball milling and product handling.

The olefin which is used in the wash procedure of the present invention may be any primary or secondary olefin which is not a solid at the washing temperature and, if a gas, is soluble in normal hydrocarbons. Ethylene, propylene, 1-butene, 3-methyl-1-butene, 1-pentene, 4-methyl-1-pentene, 1-hexene, styrene, allyl benzene, dimethyl butene, dodecene, tetradecene, mixtures of dodecene and tetradecene, cyclohexene and dimethylbutene can all be used to advantage in the present invention.

It is necessary that the olefin come into contact with the catalyst component in a liquid medium. The olefin itself can be used in pure liquid form or the olefin can be dissolved in a solvent such as heptane. In the latter case, the catalyst component would then be washed with the olefin-solvent solution. It is preferable that the washing take place for a period of at least about one minute because it appears that complexes of electron donor-aluminum chloride and aluminum chloride-olefin are formed and one minute of contact promotes such formation. The temperature may be from about 0° C. to about 100° C. because the extraction of these complexes is facilitated at elevated temperature. The washing procedure can be performed once or can be repeated several times. It is observed that no more than one washing is normally necessary to achieve the advantages of the present invention. The olefin washing is described in our copending application Ser. No. 530,533 entitled "Improved Olefin Polymerization Catalyst Activity by Olefin Washing" filed concurrently herewith.

It is theorized that the improvement in catalyst productivity is achieved in part by the method of the present invention because the olefin washing removes aluminum trichloride or complexes of aluminum trichloride with the electron donor or the olefin from the titanium halide component. This is thought to increase the productivity because the aluminum trichloride has a negative effect thereon because its presence can take the chlorine:aluminum ratio out of the acceptable range. It appears that by removing aluminum trichloride, some of the cationic reactions which cause the formation of oligomers are eliminated.

Finally, to achieve the ultimate advantages of the present invention, the electron donor which has been removed by the washing step above is added back to the catalyst component. It is preferred that from about 0.1 to about 2.0 grams of the electron donor per gram of catalyst be added back to the catalyst component. If less than 0.1 grams of electron donor per gram of catalyst are used, there will be some improvement in the productivity of the catalyst but, for all practical purposes, at least 0.1 should be used. If more than 2 grams of electron donor per gram of catalyst are used, the catalyst will be deactivated.

The electron donor may be readded to the catalyst by suspending the catalyst in a solvent such as heptane and adding the electron donor to this solution or slurry where it can stand for as long as 16 hours prior to use and polymerization. The electron donor can also be readded to the catalyst component during or just prior to polymerization. In one method, the catalyst component is placed in the polymerization zone, then the electron donor is added, and finally the aluminum alkyl is added. In another method, the aluminum alkyl is placed in the polymerization zone first, then the electron donor is added, and finally, the catalyst component is added.

It is theorized that the readdition of the electron donor through the catalyst component after olefin washing increases the productivity of the catalyst because it further activates the catalyst because the aluminum chloride has been removed. The initial washing step is extremely important. A greater increase in catalyst productivity is seen when the catalyst component is first washed with an olefin and then electron donor is added back to the catalyst component than when the catalyst component is not washed and additional electron donor is added thereto.

After the titanium halide component has been washed and electron donor has been added back according to the present invention, it then can be used as a polymerization catalyst by activating it with an activator such as an aluminum alkyl. Suitable aluminum alkyls are those of the formula

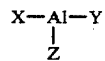

$$X-Al-Y$$
$$\mid$$
$$Z$$

where X and Y are each alkyl of not more than 8, especially not more than 2, carbon atoms, and Z is halogen or alkyl of not more than 8, especially not more than 2, carbon atoms. These are so well known from the literature and from industrial practice that they do not require more detailed discussions here. Particularly important examples are triethylaluminum and diethylaluminum chloride.

EXAMPLE I

In this example, several samples of the same polymerization catalyst comprised of an aluminum activated aluminum trichloride co-crystallized titanium trichloride catalyst component modified with butyl benzoate by extensive ball milling were used to polymerize propylene. All of the propylene polymerizations were carried out in the gas phase at 6.44 atmospheres for 1 hour at 80° C. Diethylaluminum chloride was the co-catalyst and the diethylaluminum chloride/titanium trichloride mole ratio was 7.0/1.0 for all experiments. The chlorine to aluminum ratio was 0.97. Where the catalyst was washed, the catalyst was washed with liquid propylene by charging 10 grams of the catalyst into a vertical cylinder with small screens at each end to hold the catalyst in. Liquid propylene was then charged to the bottom valve and the top valve of the cylinder was opened slightly so that propylene could flow through the cylinder at a rate of about 22 grams per minute. After five minutes, the top valve was shut and the cylinder was vented through the bottom. At first, a yellowish milky solution came out the top of the wash vessel with the liquid propylene with the evolution of some smoke. After the first minute or so, the color became clear because, it is theorized, the complex of aluminum trichloride and butyl benzoate was removed with the propylene. The washed catalyst component was introduced into the polymerization reactor, followed by the indicated number of grams of butyl benzoate per gram of catalyst, and finally by the diethylaluminum chloride. The results are set out in the following table.

TABLE 1

| Catalyst | Washing Agent | Gms. Butyl Benz. Readded per Gms. Cat. Component | Prod. (gms. pp/ gms. TiCl$_3$-hrs.- atmospheres | % Heptane Insolubles |
|---|---|---|---|---|
| Control | — | — | 37 | 97.1 |
| 1 | Propylene | — | 50.6 | 95.7 |
| 2 | — | 0.166 | 58.5 | 97.5 |
| 2 | — | 0.166 | 56 | 98.2 |
| 2 | Propylene | 0.166 | 60 | 97.5 |
| 2 | Propylene | 0.166 | 74.0 | 97.7 |
| 3 | Propylene | 0.6 | 76.0 | 96.7 |
| 4 | Propylene | 1.33 | 47* | 97.0 |
| 4 | Propyl | 1.33 | 56 | 95.7 |

*The catalyst lumped up or the productivity would have been higher.

It can be seen by comparing the control sample and catalyst 1 with the treated catalysts 2, 3, and 4 that the process of the present invention greatly increases the productivity of the catalyst. Also, a comparison of the washed and unwashed samples of catalyst 2 shows that the combination of washing and readdition is better than readdition alone.

EXAMPLE II

The procedure of Example I was followed and several other catalyst samples with a chlorine to aluminum ratio of 1.018 were evaluated. The results are set out below.

TABLE 2

| Catalyst | Washing Agent | Gms. Butyl Benz. Readded per Gms. Cat. Component | Prod. (gms. pp/gms. TiCl₃-hrs.-atmospheres) | % Heptane Insolubles |
|---|---|---|---|---|
| Control | — | — | 25.46 | 93.6 |
| Control | — | — | 25.46 | 93.6 |
| 1 | Propylene | — | 41.2 | 95.0 |
| 2 | Propylene | 0.166 | 53.3 | 96.5 |
| 3 | — | 0.33 | 46.0 | 96.9 |
| 3 | Propylene | 0.33 | 62.8 | 96.9 |
| 4 | Propylene | 0.6 | 68.7 | 96.7 |
| 5 | — | 0.66 | 64.0 | 97.2 |
| 5 | Propylene | 0.66 | 61.0 | 96.7 |
| 6 | — | 1.0 | 41.0 | 96.1 |
| 6 | — | 1.0 | 42.0 | 96.3 |
| 6 | Propylene | 1.0 | 62.0 | 95.4 |
| 7 | — | 1.33 | 53.7 | 97.1 |

It can be seen that in all cases, the process of the present invention greatly increased the productivity of the catalyst without adversely affecting the crystallinity of the polymer produced. The productivity of the washed sample of catalyst 5 is lower because the diethylaluminum chloride to titanium trichloride ratio used was 3.8:1. Using a lower ratio results in decreased productivity. A direct comparison of the unwashed and washed samples of catalysts 3 and 6 shows that the process of the present invention produces a catalyst with a higher productivity than readdition alone.

We claim:

1. A method for increasing the productivity of an olefin polymerization catalyst containing an aluminum chloride co-crystallized titanium halide modified with an electron donor containing an ester group which comprises washing the modified titanium halide with an olefin and then adding back electron donor to the washed catalyst component.

2. The method of claim 1 wherein from about 0.1 to about 2 grams of the electron donor per gram of catalyst is added back to the catalyst component.

3. The method of claim 1 wherein the electron donor is selected from the group consisting of alkyl esters of saturated and unsaturated aliphatic and aromatic acids.

4. The method of claim 3 wherein the organic acid ester is selected from the group consisting of butyl benzoate and ethyl phenyl acetate.

5. The method of claim 1 wherein the washed catalyst component is suspended in a solvent and the electron donor is added thereto.

6. The method for claim 1 wherein the electron donor is readded to the catalyst component in the polymerization reactor.

7. The method of claim 6 wherein the order of addition is catalyst component, electron donor, and aluminum alkyl.

8. The method of claim 6 wherein the order of addition is aluminum alkyl, electron donor, and catalyst component.

* * * * *